Nov. 5, 1940.   R. J. RODD   2,220,285
MEANS FOR TEMPORARILY SUPPORTING DRINKING GLASSES,
JARS, AND OTHER CONTAINERS
Filed Aug. 5, 1938
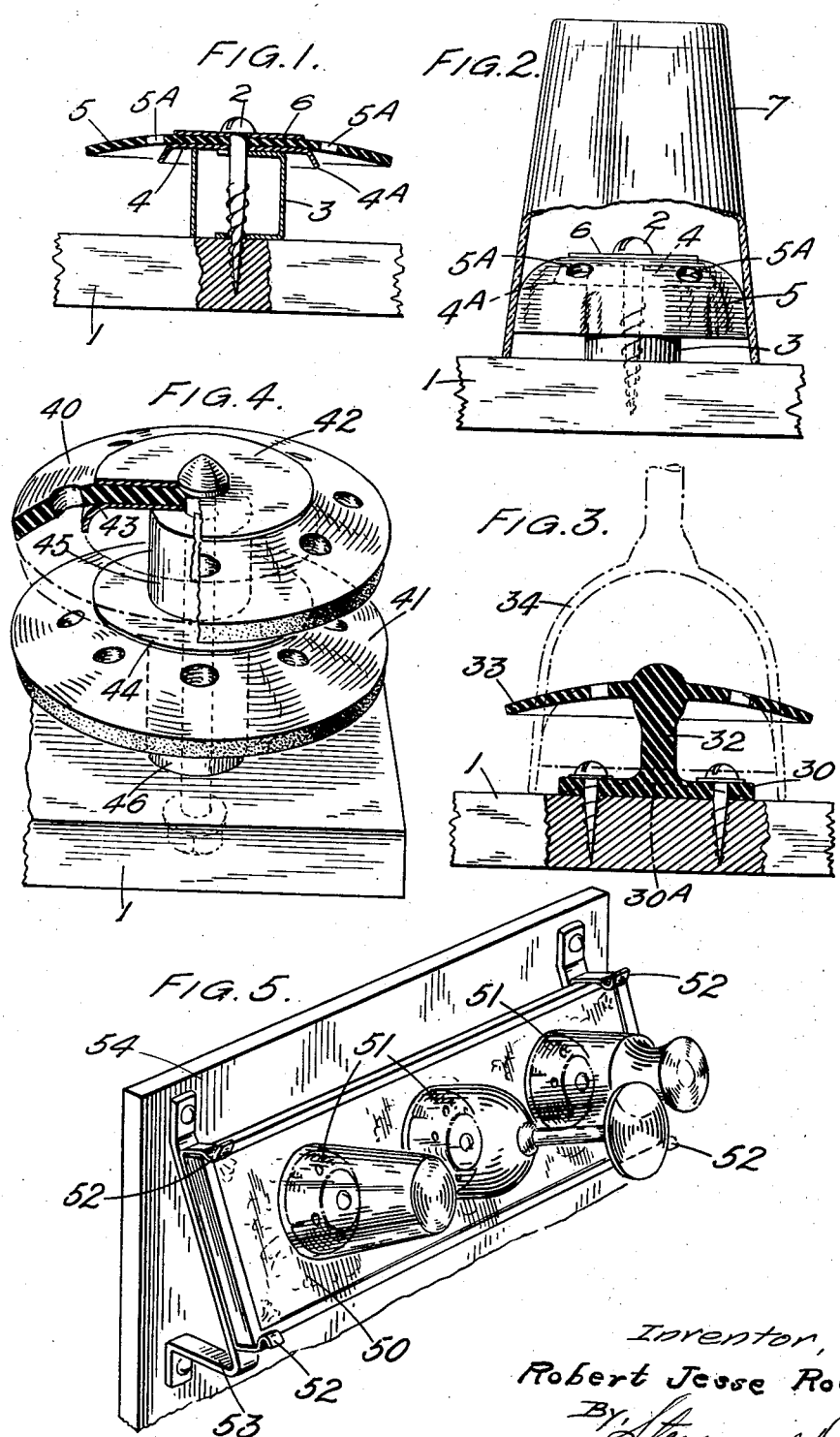
Inventor,
Robert Jesse Rodd Patented Nov. 5, 1940

2,220,285

UNITED STATES PATENT OFFICE 2,220,285

MEANS FOR TEMPORARILY SUPPORTING DRINKING GLASSES, JARS, AND OTHER CONTAINERS

Robert Jesse Rodd, Walton-on-Thames, England

Application August 5, 1938, Serial No. 223,315
In Great Britain February 1, 1938

4 Claims. (Cl. 248—313)

My invention relates to suport means for drinking glasses, cups or like crockery, or other hollow-ware such as may be used, for example, in domestic circumstances, in restaurants, railway trains, ships, or aircraft. For convenience I will call such articles "ware." It is of course desirable to reduce breakage and chipping, to prevent rattling, and to be able to accommodate such articles so that they are easily accessible. Moreover it is very convenient to be able to store, for example, a set of glasses, and be able to carry them about as on a tray, without risk of letting them slide or fall. It has previously been proposed to provide a ring-like fitting with an elastic inner margin to receive and lightly grip a drinking glass for example in ships.

The broad objects of this invention are already indicated, and a further object is the provision of a support capable of holding wares of differing size and shape. Yet another object is to hold wares firmly yet resiliently, without difficulty of removal. And another object is to provide a tray-like portable unit to act alternatively as a place of storage and a means for carrying glasses or the like from place to place.

The invention is illustrated in the accompanying drawing, in which:

Figure 1 is a diagrammatic section through a support;

Figure 2, in perspective, illustrates the same in use;

Figure 3, in section shows a similar device made as a one-piece moulding;

Figure 4 shows in partly sectional perspective an alternative, more elaborate, support; and Figure 5 shows in perspective a grouped unit forming both a rack and a carrier.

In Figure 1, there is shown a foundation 1, of wood, to which are secured by a wood-screw 2 an assemblage comprising a cylindrical metal spacing ferrule 3; an annular disc 4 of metal with a curvedly flanged edge at 4A directed towards the foundation 1; a disc 5 of sheet rubber, with central hole for the screw; and an outer metal disc 6 to clamp the middle part of the rubber disc 5 against the disc 4. Holes 5A pierce the disc 5 to prevent air-locking, and the disc may have a scalloped or serrated edge or be otherwise varied as to exact shape. If a drinking glass such as 7 (Fig. 2) be pressed over the assemblage the radially outstanding skirt of the disc 5 is distorted, reminiscently of a mushroom, towards the foundation 1. The glass 7 is then held, and resiliently supported, being frictionally borne upon by the rubber internally. Even a wet glass is, in the support proportioned roughly as shown, held quite sufficiently to be suspended. A direct pull will remove the glass, but it is easier if it be slightly canted during removal. The rubber is of a fairly soft and flexible texture, and it is found that the form known as expanded rubber is very satisfactory.

A similar device is seen in Fig. 3, but made as a single moulding of rubber. A base disc 30 is screwed or otherwise attached (e. g. by suction due to hollowing at 30A) to the foundation 1, and centrally there is formed an integral stalk 32, carrying an integral disc-like head 33. The rim of a glass such as 34 can rest on the disc 30.

In Figure 4 the rubber disc is shown duplicated for supporting heavy wares or for use in excessive vibration. Two discs 40, 41, are clamped as in Fig. 1, between respective pairs of metal discs such as 42, 43, 44, the underneath one (43) of each pair being flanged for preference. The make-ups of rubber and metal discs are spaced by the cylindrical ferrule 45 and the lower make-up is spaced from the foundation by ferrule 46. The whole is assembled on a central bolt or screw. The rubber discs 40, 41, are of the same diameter and are perforated, but the outer one 40 may be of lesser diameter than the inner 41, if desired.

Figure 5 shows a tray or rack foundation, namely a board 50, having three supports 51 thereon made according to any other figure. The board, conveniently, is supportable by spring clips at 52 on brackets 53 attached to a wall or bulkhead 54. The board with a load of glasses, cups, etc., may be removed and carried about, and replaced, with complete liberty. A steward on a railroad or ship, for example, may carry it in any position without the glasses falling off, being broken, or soiled. A board or tray so furnished may be used as a shelf in a closet, or as a sliding drawer in a piece of furniture such as a cellarette or cocktail cabinet, and a set or a miscellany of appropriate glasses be rendered safe and accessible thereby.

What I claim is:

1. A holder for hollow ware comprising a support and an elastic disc-like element carried by said support and extending radially therefrom, said element having a diameter greater than the hollow of said ware so that it may uniformly engage all sides thereof by means of friction upon insertion within said hollow.

2. A holder for hollow ware comprising a rigid support and an elastic disc-like element carried by said support and extending radially therefrom, said element having a diameter greater than the hollow of said ware so that it may uniformly engage all sides thereof by means of friction upon insertion within said hollow.

3. A holder for hollow ware comprising a flexible support and an elastic disc-like element carried by said support and extending radially therefrom, said element having a diameter greater than the hollow of said ware so that it may uniformly engage all sides thereof by means of friction upon insertion within said hollow.

4. A holder for hollow ware comprising a support and a pair of axially spaced elastic disc-like elements carried by said support and extending radially therefrom, said elements having a diameter greater than the hollow of said ware so that they may uniformly engage all sides thereof by means of friction upon insertion within said hollow.

ROBERT JESSE RODD.